United States Patent
Guest et al.

(10) Patent No.: US 11,177,658 B2
(45) Date of Patent: Nov. 16, 2021

(54) METHOD TO REDUCE HARMONICS IN THE ELECTRICAL OUTPUT OF A POWER PLANT

(71) Applicant: Siemens Gamesa Renewable Energy A/S, Brande (DK)

(72) Inventors: Emerson Guest, Malmo (SE); Kim Hoej Jensen, Faxe (DK); Lei Shuai, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 53 days.

(21) Appl. No.: 16/500,138

(22) PCT Filed: Jan. 30, 2018

(86) PCT No.: PCT/EP2018/052251
§ 371 (c)(1),
(2) Date: Oct. 2, 2019

(87) PCT Pub. No.: WO2018/184747
PCT Pub. Date: Oct. 11, 2018

(65) Prior Publication Data
US 2021/0119448 A1    Apr. 22, 2021

(30) Foreign Application Priority Data

Apr. 5, 2017   (DE) .................. 10 2017 205 816.1

(51) Int. Cl.
*H02J 3/01* (2006.01)
*H02J 3/38* (2006.01)
*H02M 1/12* (2006.01)

(52) U.S. Cl.
CPC ............... *H02J 3/01* (2013.01); *H02J 3/381* (2013.01); *H02M 1/12* (2013.01); *H02J 2300/24* (2020.01); *H02J 2300/28* (2020.01)

(58) Field of Classification Search
CPC .................. H02J 3/01; H02J 3/381
(Continued)

(56) References Cited

U.S. PATENT DOCUMENTS 5,434,771 A * 7/1995 Danby ............... H02M 7/493
                                                          363/41
8,217,533 B2 * 7/2012 Jones .................. H02J 3/01
                                                          307/82

(Continued)

FOREIGN PATENT DOCUMENTS

DE     102012209579 A1   12/2013
EP          2073374 A1    6/2009
(Continued)

OTHER PUBLICATIONS

PCT International Search Report dated Apr. 4, 2018 corresponding to PCT/EP2018/052251.
(Continued)

*Primary Examiner* — Adi Amrany
(74) *Attorney, Agent, or Firm* — Schmeiser, Olsen & Watts LLP (57) ABSTRACT

A method to reduce harmonics in the electrical output (i.e. voltage and current) of a power plant is provided. The power plant is connected via a point of common coupling with an electrical grid. Converters of the power plant provide respective electrical converter output by an applied pulse-width modulation scheme, which is used in the respective converter. The electrical output of the respective converters is summed to generate the electrical output of the power plant. The electrical output of the power plant is provided via the point of common coupling to the electrical grid. Carrier sideband harmonics, which are generated by the converters, are measured in the electrical output of the power plant. A carrier signal of at least one selected converter is adjusted in its phase until specified and characteristic harmonics in the
(Continued)

electrical output of the power plant are reduced below a given threshold.

12 Claims, 6 Drawing Sheets

(58) Field of Classification Search
USPC .......................................................... 307/43
See application file for complete search history.

(56) References Cited

U.S. PATENT DOCUMENTS

| | | | |
|---|---|---|---|
| 8,405,251 B2* | 3/2013 | Barton | H02J 3/38 |
| | | | 307/84 |
| 9,252,657 B2* | 2/2016 | Zhang | H02M 7/493 |
| 2003/0131323 A1* | 7/2003 | McConaghy | G06F 30/36 |
| | | | 716/102 |
| 2006/0229931 A1* | 10/2006 | Fligler | G06Q 30/02 |
| | | | 705/7.38 |
| 2010/0156192 A1* | 6/2010 | Wang | H02J 3/01 |
| | | | 307/82 |
| 2012/0019007 A1 | 1/2012 | Nelson et al. | |
| 2012/0193991 A1 | 8/2012 | Jensen et al. | |
| 2013/0038123 A1* | 2/2013 | Wilkins | H02J 13/0079 |
| | | | 307/18 |
| 2014/0152292 A1 | 6/2014 | Andresen et al. | |
| 2015/0035284 A1 | 2/2015 | Yang et al. | |
| 2016/0087436 A1 | 3/2016 | Matan et al. | |

FOREIGN PATENT DOCUMENTS

| | | |
|---|---|---|
| EP | 2209200 A2 | 7/2010 |
| EP | 2381555 A2 | 10/2011 |

OTHER PUBLICATIONS

European Communication pursuant to Article 94(3) EPC dated Jan. 13, 2021 for Application No. 18 704 462.3.

* cited by examiner

METHOD TO REDUCE HARMONICS IN THE ELECTRICAL OUTPUT OF A POWER PLANT

CROSS-REFERENCE TO RELATED APPLICATIONS

This application claims priority to PCT Application No. PCT/EP2018/052251, having a filing date of Jan. 30, 2018, which is based on German Application No. 10 2017 205 816.1, having a filing date of Apr. 5, 2017, the entire contents both of which are hereby incorporated by reference.

FIELD OF TECHNOLOGY

The following relates to a method to reduce harmonics in the electrical output (i.e. voltage and current) of a power plant. The harmonics are cancelled in reference to a point of common coupling, which connects the power plant with an external grid.

BACKGROUND

Converters of the power plant are jointly coupled with the point of common coupling thus each converter provides a respective electrical converter output via the point of common coupling to the external grid.

The power plant could be a wind power plant (wind farm) or a solar power plant or the like.

A pulse width modulation scheme is used by the converters to generate the respective electrical output of each converter.

It is known that this setup causes "carrier sideband" harmonics at the point of common coupling.

Figure 6:
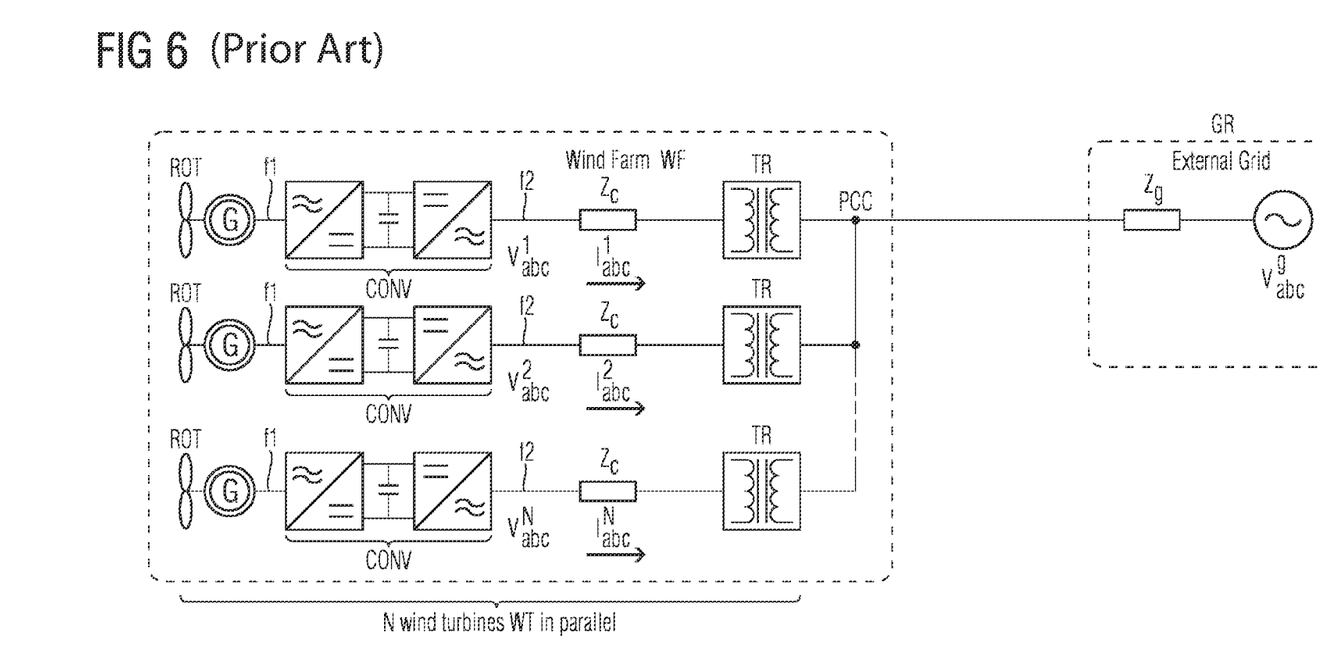
FIG. 6 shows a principle overview of a wind farm WF according to the known art.

FIG. 6 shows a principle overview of a wind farm WF according to the known art.

The wind farm WF comprises a number N of wind turbines WT. Each wind turbine WT comprises a rotor ROT, which is driven by the wind W.

The rotor ROT is connected with an electrical generator G, which is used to generate electrical power with a variable frequency f1 based on the wind W.

The generator G is connected with an AC/AC converter CONV, which is used to convert the electrical power with the variable frequency f1 into electrical power with a stable and grid compliant frequency f2—preferable to 50 Hz or 60 Hz within a given and pre-defined range of frequency deviation for example.

The AC-AC converter CONV comprises in a serial connection an AC/DC sub-converter and a subsequent DC/AC sub-converter. The common DC link of the connected sub-converters comprises a capacitor, which is used to balance DC-power.

The AC/AC converter CONV is connected via an impedance Zc with a transformer TR, which is used to transform the amplitude of the voltage of the respective electrical power to a grid-compliant voltage value.

In view to the wind turbines WT of the wind farm WF all transformers TR are parallel and their outputs are jointly connected via a point of common coupling PCC with an external grid GR.

This grid GR could be part of a sub-grid of a larger power-installation or could even be the grid of an external grid operator.

The converters CONV are power electronic converters using a high frequency switching inside for the frequency conversion.

This results in an introduction of a spectrum of harmonics in the output voltage $V_{abc}^{N}$ and in the output current $I_{abc}^{N}$ of the wind farm WF. These harmonics are seen at the point of common coupling PCC influencing the electrical grid GR.

In the wind farm WF each wind turbine WT contributes to the generation of these harmonics via the respective converter CONV. The generation of harmonics is undesirable in view of mandatory power quality regulations of the grid. According to the regulations the harmonics need to be kept below given levels, which are stipulated in grid-regulation schemes and in grid-standards as well.

SUMMARY

An aspect relates to an improved method to reduce or even cancel harmonics in the output voltage and current of a power plant farm, i.e. of a wind farm.

According to the method of the embodiments, harmonics in the electrical output of a power plant are reduced. The power plant is connected via a point of common coupling with an electrical grid. Converters of the power plant provide respective electrical converter output by an applied pulse-width modulation scheme, which is used in the respective converter. The electrical output of the respective converters is summed to generate the electrical output of the power plant. The electrical output of the power plant is provided via the point of common coupling to the electrical grid. Carrier sideband harmonics, which are generated by the converters, are measured in the electrical output of the power plant. A carrier signal of at least one selected converter is adjusted in its phase until specified and characteristic harmonics in the electrical output of the power plant are reduced below a given threshold value.

In a preferred configuration the carrier sideband harmonics are measured at the point of common coupling.

In a preferred configuration the carrier signal of at least one converter is adjusted in its phase until it becomes inverted.

In a preferred configuration harmonics in the electrical voltage and/or in the electrical current of the electrical output of the power plant are reduced.

In a preferred configuration the electrical output of the power plant is provided via the point of common coupling to an electrical grid of a grid operator.

In a preferred configuration the electrical output is generated by a solar plant and is provided via the point of common coupling to the electrical grid.

In a preferred configuration the electrical output, generated of a wind power plant, is provided via the point of common coupling to the electrical grid, while the wind farm comprises a number of wind turbines. Each wind turbine comprises in a serial connection a rotor, a generator, an AC/AC converter and a transformer and while the outputs of the transformers are connected via a point of common coupling with an external grid. The wind power is transformed via the rotor and the electrical generator into electrical The electrical power with the variable first frequency is transformed via the AC/AC converter and via the transformer into electrical power with a defined second frequency, while the voltage share of the electrical power show a defined amplitude. power with a variable first frequency. The electrical power of all transformers is summoned up in the point of common coupling and are provided to the external electrical grid. The harmonics of the voltage share of the electrical power and/or the harmonics of the current share of the electrical power are measured at the point of common coupling. The carrier signal of at least one selected converter is adjusted in its phase until the measured harmonics are reduced below a given threshold value.

In a preferred configuration the phase-adjustment of the carrier signal is done based on a search algorithm.

The search algorithm generates a random search in the available space of converter states. The state is defined by the fact if a respective carrier phase is changed or not.

In a preferred configuration the search algorithm analyzes respective carrier phase adjustments and resulting magnitude changes of the measured harmonics in real time.

In a preferred configuration the search algorithm controls the respective carrier phase adjustments in real time.

In a preferred configuration the carrier signal of converters of certain wind turbines are shifted by 180° thus the respective carrier signal is inverted.

In a preferred configuration the converters are full scale converters.

The search algorithm described above is heading for an optimum carrier-phase adjustment. Only those carrier signal adjustments are permitted, which result in reduction or cancelling of the magnitudes of the harmonics at the measurement point. Thus, a local optimum for characteristic harmonics is found.

Embodiments of the invention are based on the fact that certain classes of generated harmonics are linked to the phase of the carrier, which is used in the modulation process.

There is an inherent diversity in the phase of the carrier, used in each wind turbine, if the converters are connected in parallel with the point of common coupling.

In a preferred configuration the carrier signal in certain converters is inverted, thus the phase of the carrier signal is shifted by 180°. This is a property of certain pulse-width modulation (PWM) schemes, which is exploited in a preferred configuration of embodiments of the invention to achieve a harmonic reduction or even cancellation of harmonics at the point of measurement—i.e. the point of common coupling.

In a preferred configuration the choice of which carrier signal is to be inverted is based on a stochastic hill-climbing search, which is done in real-time.

Stochastic hill-climbing is only one approach as it is most simple. In general, other search algorithms even could be used.

The search algorithm is used to minimize a pre-determined score function (i.e. reflecting those harmonic distortion which needs to be minimized or reflecting specific harmonic magnitudes) by inverting the carrier signal and its waveform in selected converters in a system of N parallel converters.

In a preferred configuration the output of the search algorithm comprises a string of binary numbers. One bit in the string corresponds to the state of the carrier wave in each wind turbine.

This allows a simple online adjustment of the voltage and current spectrum generated the converters without requiring a timing synchronization signal.

The search algorithm can be applied to any initial state of each converter of the wind farm and for any wind farm setup. The only requirement is a communication channel from each wind turbine control or wind turbine converter to a central location, which is usually already available.

In a preferred configuration the reduction of the harmonic-levels is done while the wind turbines of the wind farm are in production mode. Thus, they are online and connected with the grid, providing power into the grid. Thus, the output signals of respective converters are adapted in real time.

The embodiments allow the reduction of characteristic harmonic levels at the point of common coupling by influencing the wind turbines inside the wind farm. This reduction is based on a local optimum, which is reached at each wind turbine of the wind farm. The local optimum for each wind turbine is chosen in a way that the resulting harmonics at the point of common coupling are reduced, avoided or cancelled.

The generation of harmonics can be changed immediately if wind turbines of the wind farm are taken out of the production mode due to service work, for example.

The embodiments counteract any change in the harmonics at the point of common coupling in real time thus reducing or even avoiding any impacts on the external grid immediately.

Local wind turbine information does not need to be sent to the search algorithm. The search algorithm only permits solutions which improve the measurement made at connection point of the wind farm to the grid. This results in the advantage of a simplified data handling.

The embodiments can be implemented easily in existing wind farms.

BRIEF DESCRIPTION

Some of the embodiments will be described in detail, with references to the following Figures, wherein like designations denote like members, wherein.

DETAILED DESCRIPTION

Figure 1:
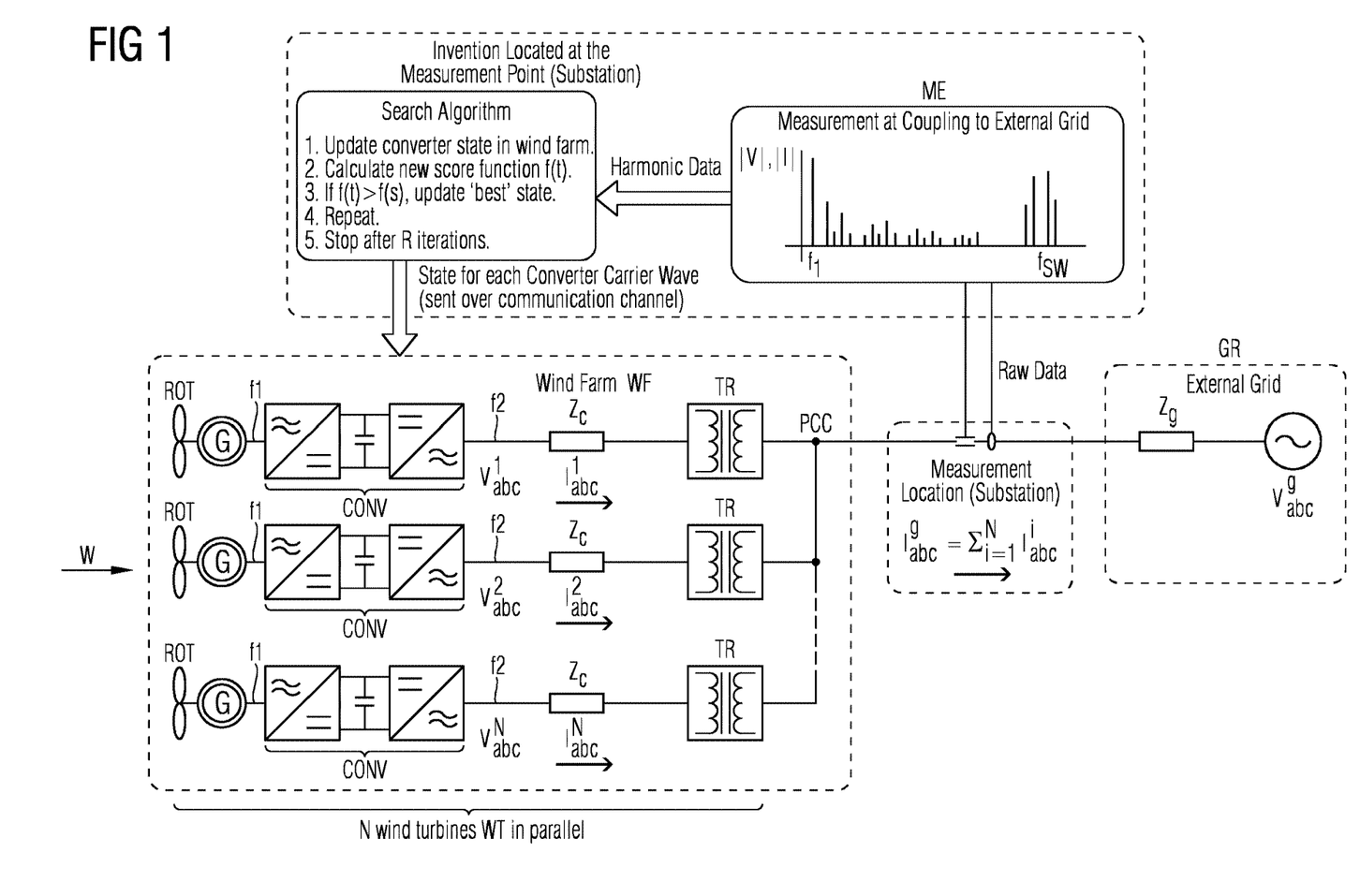
FIG. 1 shows a principle overview of a wind farm WF, according to embodiments of the invention.

FIG. 1 shows a principle overview of a wind farm WF, according to embodiments of the invention.

For principle parts of the wind farm WF reference is made to FIG. 6 and its description in the introduction above.

The point of common coupling PCC is used as a measurement location ML as respective measurement equipment.

The measurement location ML is used to measure the frequency-magnitude-harmonics spectrum of the voltage and of the current at the point of common coupling PCC.

The measurement location ML could be arranged at a sub-station in a preferred configuration, if the grid GR is a sub-grid or a part of a larger power-grid network.

The output currents $I_{abc}^1$, $I_{abc}^2$ up to $I_{abc}^N$ are summoned up to a current $I_{abc}^g$ at the point of common coupling PCC.

The magnitudes |U| and |I| of the voltage V and of the current I are measured as raw data at the measurement location ML and are reported as harmonic data to the search algorithm, which is a central part of embodiments of the invention.

In a preferred configuration the search algorithm is located at the sub-station, too.

The search algorithm comprises these steps:
1. Update converter state in wind farm.
2. Calculate new score function f(t).
3. If f(t)>f(s), update 'best' state.
4. Repeat.
5. Stop after R iterations.

The search algorithm is described in more detail in figure FIG. 5 below.

The term "update converter state in wind farm" in step 1 describes that the carrier signal of one or more converters is/are shifted in their phase (i.e. that the carrier is inverted).

In a preferred configuration some of the converters are randomly picked out and their "Puls Width Modulation, PWM" state is inverted at each step of the algorithm.

Based on this update the magnitudes |U| and |I| of the voltage V and/or of the current I are measured again, thus characteristic harmonics of the voltage and of the current are measured at the point of common coupling PCC.

The carrier signal of converters of selected wind turbines of the wind farm are adjusted in their phase. These carrier-signal-adjustments lead to a change in the magnitudes of the harmonics at the point of common coupling.

The search algorithm is used to analyze the carrier adjustment and the resulting magnitude changes.

The search algorithm is heading for an optimum carrier-phase adjustment. Only those carrier signal adjustments are permitted, which results in reduction or cancelling of the magnitudes of the measured harmonics. Thus, a local optimum for characteristic harmonics is found.

The carrier signal in certain wind turbine converters might be inverted, thus the phase of the carrier signal is shifted by 180°. This is a property of certain pulse-width modulation (PWM) schemes, which is exploited in a preferred configuration to achieve a harmonic reduction or even cancellation at the point of common coupling.

In a preferred configuration the choice of which carrier signal is to be inverted is based on a stochastic hill-climbing search, which is done in real-time and which is addressed above by the steps 2 up top 5.

The phase shift of the respective converter carriers is sent as "state for each converter carrier wave" via a communication channel to the respective converters.

Figure 2:
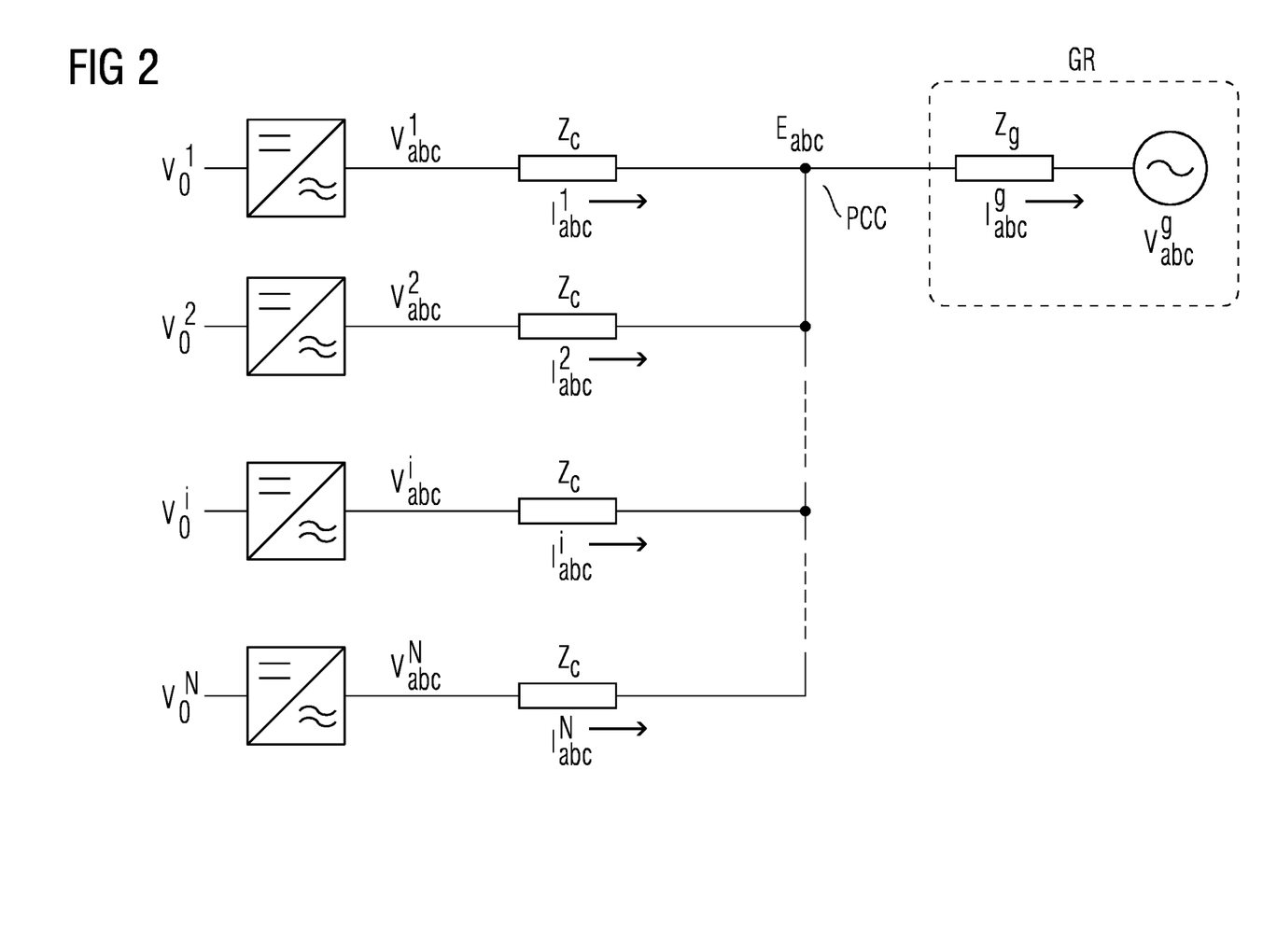
FIG. 2 shows a single line diagram of N parallel and grid connected converters in reference to FIG. 1.

FIG. 2 shows a single line diagram of N parallel and grid connected converters in reference to FIG. 1.

The outputs of a number of N converters are connected in parallel with the point of common coupling PCC.

The harmonic current $I_{abc}^g(h)$ at each harmonic with order h is summoned up like this:

$$I_{abc}^g(h) = \Sigma_{i=1}^{N} I_{abc}^i(h)$$

The aggregated current could be measured at the point of common coupling PCC and could be used as input for the reduction of the harmonics.

The aggregated voltage can also be used for this purpose, either separate or additionally. It is up to the operator to decide which measurement should be used as input for the reduction of the harmonics.

An inherent diversity between the phase of the carrier signal in the pulse-width modulation scheme of each converter will cause the aggregated current magnitude $I_{abc}^g(h)$ to be lower than the sum of the magnitudes of the individual currents $I_{abc}^i(h)$ from each wind turbine.

However, the degree of attenuation depends on the initial state of the converters and thereby has a statistical basis.

According to embodiments of the invention the aggregated current magnitude $I_{abc}^g(h)$ for certain classes of harmonics are actively minimized by selection of converters in a system of N parallel wind turbines, which have to invert their carrier signal (which is equal to a phase shift of 180°).

For inverting the carrier signal of the converter, the phase of the harmonic voltages around the 1st carrier frequency is inverted by radians.

Figure 4:
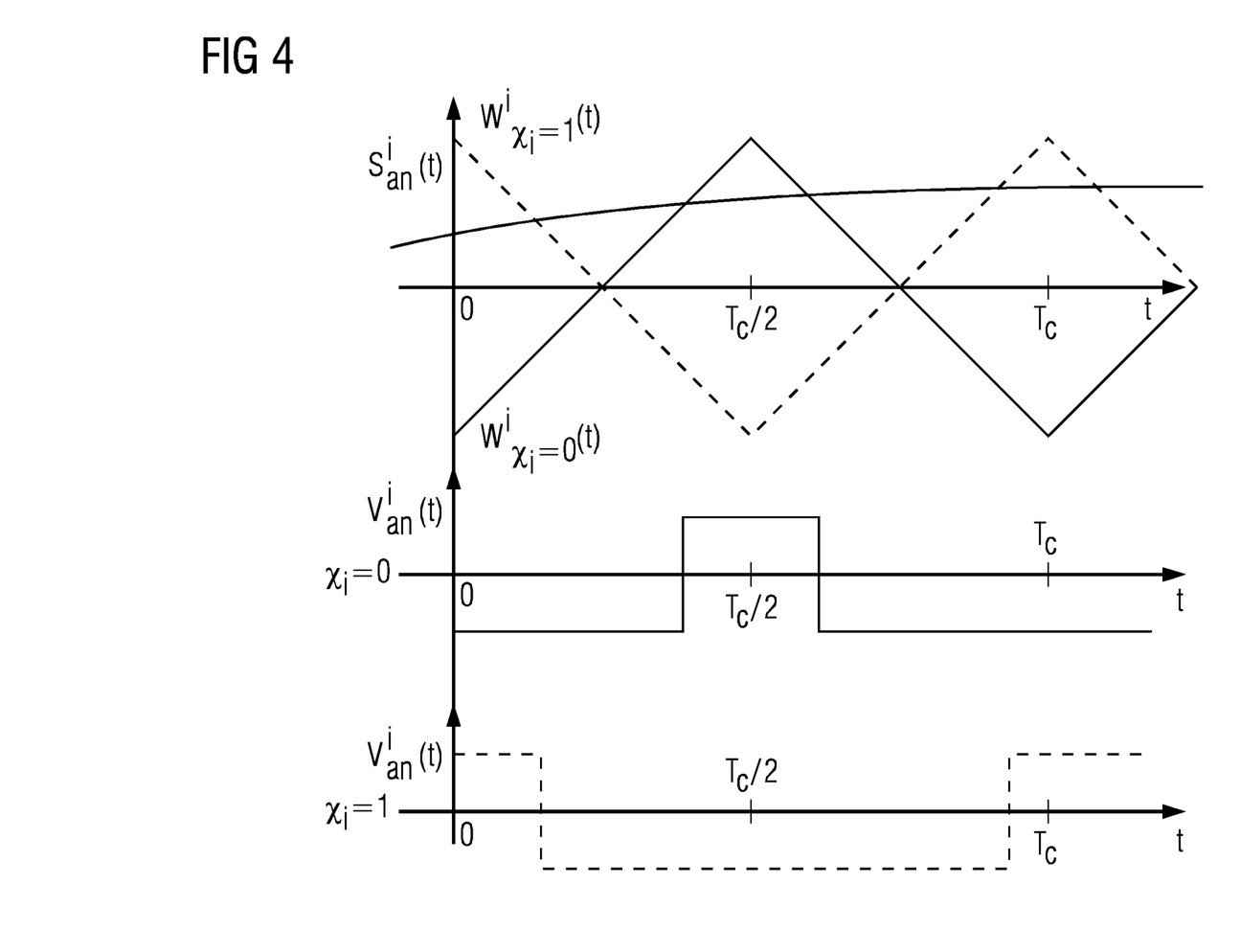
FIG. 4 shows a normal and an inverted carrier waveform position and a resulting pulse placement of a PWM-scheme according to embodiments of the invention.

An example of inverting the carrier and thereby the pulse placement of a single inverter is shown in FIG. 4 below.

Figure 3:
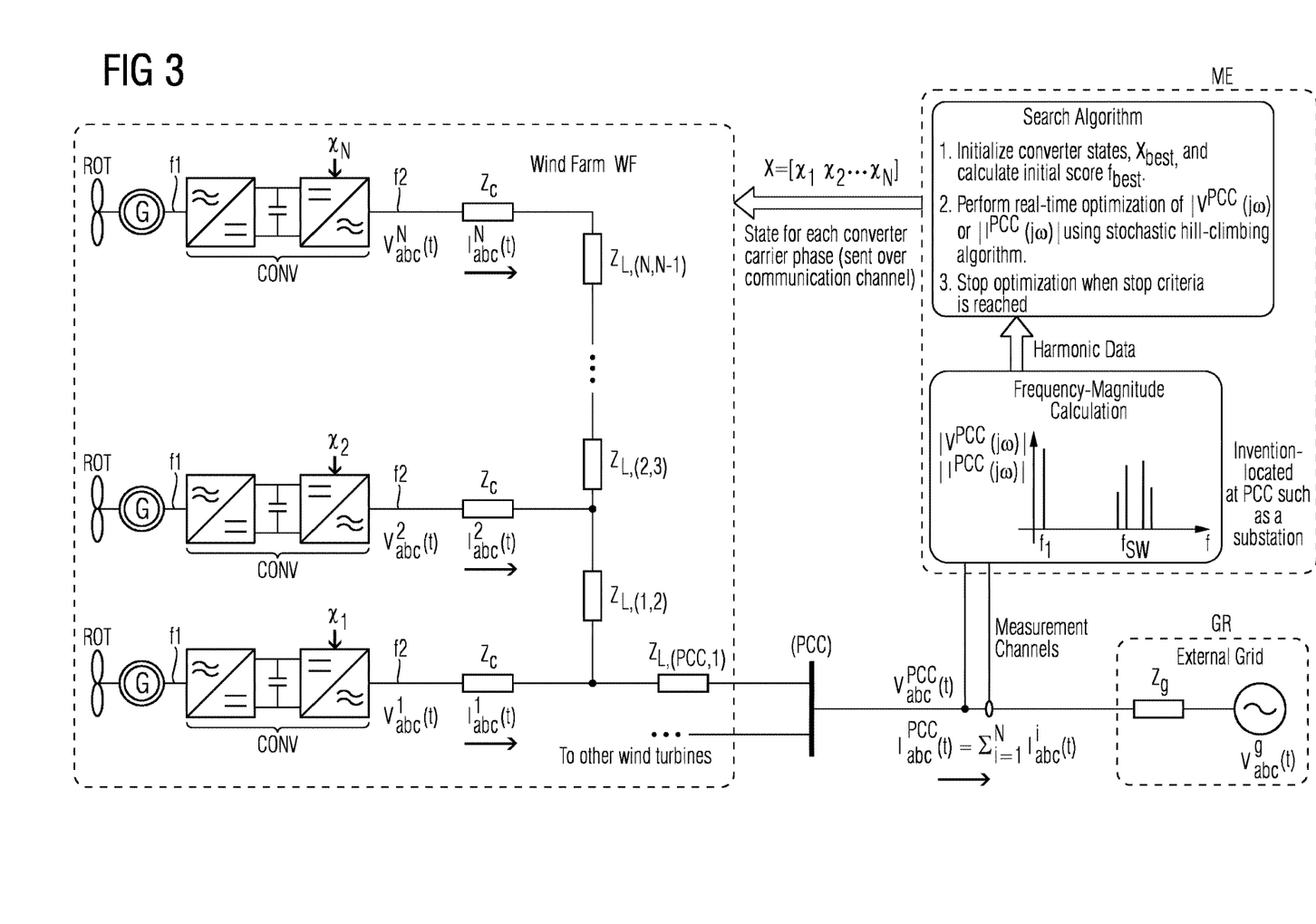
FIG. 3 shows a more general overview of a wind farm WF, according to embodiments of the invention.

FIG. 3 shows a more general overview of a wind farm WF, according to embodiments of the invention.

In this example the respective transformers were transformed and combined together with properties of the grid network in representing impedances Z.

The principle functionality of the search algorithm shown in this FIG. 3 is the same as shown FIG. 1.

FIG. 4 shows a normal and an inverted carrier waveform position and a resulting pulse placement of a PWM-scheme according to embodiments of the invention.

The method for choosing which converters will have their carrier signals inverted is based on a search algorithm, i.e. based on the "stochastic hill-climbing" algorithm.

This algorithm comprises the following basic steps:
1. Calculate a score f(s) for the initial state s of the aggregated harmonics at the wind farm connection point (PCC) or at a desired point of optimization.
2. Select from a uniform probability distribution one or more of the wind turbine converters to have their carrier waveform inverted and define the new wind farm state t.
3. Calculate the score f(t).
4. If f(t)≥f(s) then t becomes the initial state, else keep s.
5. Repeat steps 1 to 4.
6. After R iterations or if a satisfactory harmonic level is achieved stop the algorithm and proceed with the best state.

The choice of the score function f(s) is flexible depending on the wishes of the wind farm owner.

Possible choices for the score function are:
Total harmonic distortion in the voltage or current.
Weighted total harmonic distortion in the voltage or current.
Selected harmonic currents or voltages.
Weighted combinations of any of the above.

It is expected that this method would measure the harmonic voltages and/or currents at the connection point to the external grid, typically a local substation.

The hardware and software for running the algorithm would be located in the substation and supply the signals for inverting the carrier waves using the existing communication channels such as fiber optic.

$W^i(t)$ is a triangular carrier used in the converter modulator. The determination, which carrier is inverted or not, is based on the fact if xi=1 or if xi=0.

$V_{an}^i(t)$ is an example of the a-phase to neutral voltage at the i-th converter terminal, depending on whether xi=1 or xi=0.

$S_{an}^i(t)$ is the a-phase to neutral modulating signal of the i-th converter.

Figure 5:
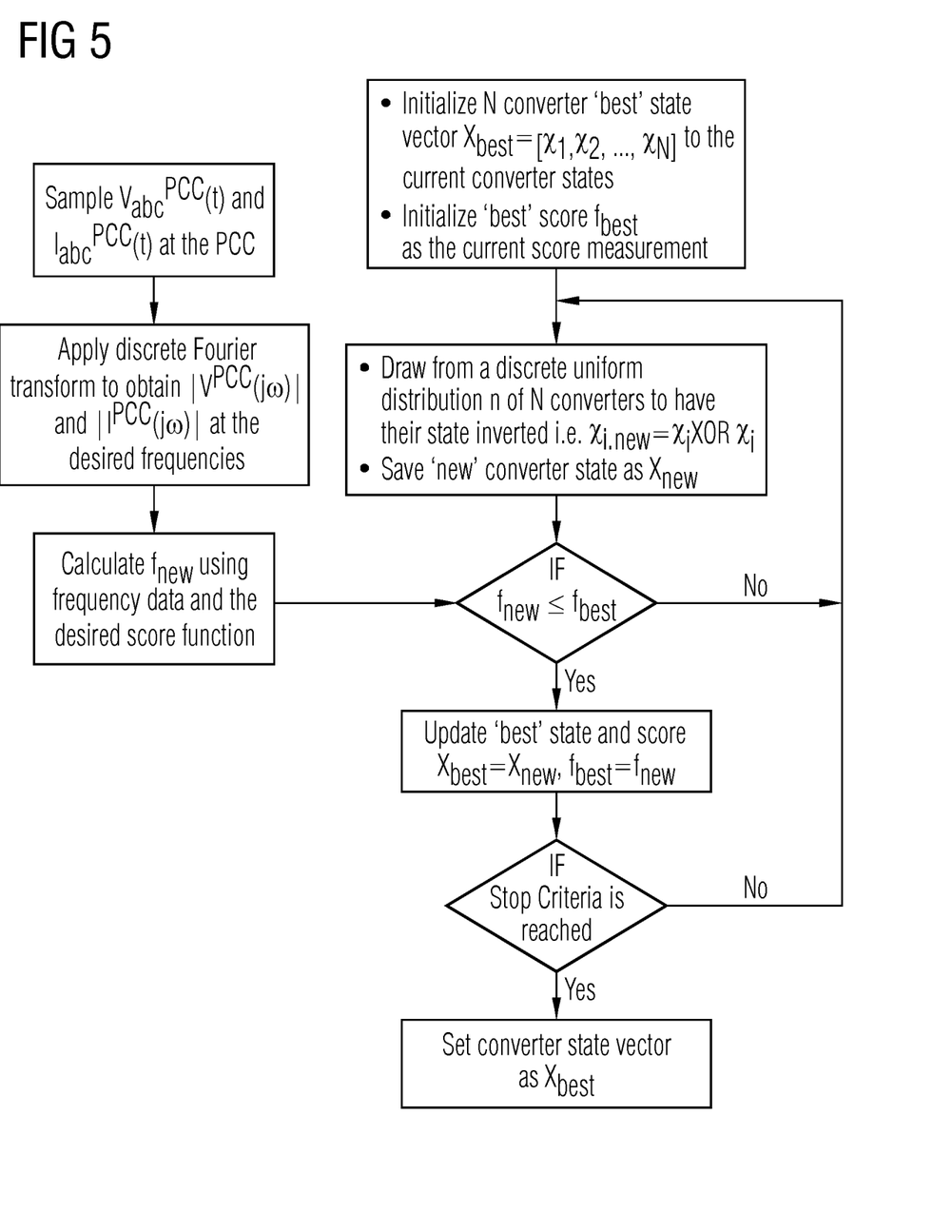
FIG. 5 shows a flow chart referring to the search algorithm according to embodiments of the invention.

FIG. 5 shows a self-explaining flow chart referring to the search algorithm according to embodiments of the invention.

Additionally, these set of explanations are given for the flow chart and for the search algorithms as shown in FIG. 1 and in FIG. 3:
1. Initially the best configuration of converter states is not known. So, the initial state is the 'best' state.

2. A score function fbest is calculated corresponding to the initial state. This is based on the voltage or current measurement at a targeted frequency.
3. The search algorithm is applied to generate a random change in SOME of the converter states.
4. A new score function fnew is calculated based on the updated power system.
5. If fnew<=fbest, then the new converter configuration is saved as 'best' state and fnew is saved as best score. If not, the previous 'best' state remains and so does the 'best' score as well.
6. Steps 3-6 are repeated a predefined number of times or are left to run indefinitely at the discretion of the operator.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method to reduce harmonics in the electrical output of a power plant, while the power plant is connected via a point of common coupling with an electrical grid,
wherein converters of the power plant providing respective electrical converter output by an applied pulse-width modulation scheme, which is used in the respective converter,
wherein the electrical output of the converters is summed to generate the electrical output of the power plant,
providing the electrical output of the power plant via the point of common coupling to the electrical grid,
the method comprising:
measuring carrier sideband harmonics, which are generated by the converters, in the electrical output of the power plant, and
phase-adjusting a carrier signal of at least one selected converter until specified and characteristic harmonics in the electrical output of the power plant are reduced below a given threshold, wherein the phase-adjusting of the carrier signal is done using a search algorithm, and wherein the search algorithm includes selecting, from a uniform probability distribution, one or more converters and inverting carrier waveforms for the selected one or more converters.

2. The method according to claim 1, wherein the carrier sideband harmonics are measured at the point of common coupling.

3. The method according to claim 1, wherein harmonics in at least one of the electrical voltage and in the electrical current of the electrical output of the power plant are reduced.

4. The method according to claim 1, wherein the electrical output of the power plant is provided via the point of common coupling to an electrical grid of a grid operator.

5. The method according to claim 1, wherein the electrical output, generated by a solar plant, is provided via the point of common coupling to the electrical grid.

6. The method according to claim 1, wherein the electrical output, generated of a wind power plant, is provided via the point of common coupling to the electrical grid, while the wind farm comprises a number of wind turbines,
while each wind turbine comprises in a serial connection a rotor, a generator, an AC/AC converter and a transformer and while the outputs of the transformers are connected via a point of common coupling with an external grid,
wherein wind power is transformed via the rotor and the electrical generator into electrical power with a variable first frequency,
wherein the electrical power with the variable first frequency is transformed via the AC/AC converter and via the transformer into electrical power with a defined second frequency, while the voltage share of the electrical power show a defined amplitude,
wherein the electrical power of all transformers is summoned up in the point of common coupling and are provided to the external grid,
wherein the harmonics of the voltage share of the electrical power and/or that the harmonics of the current share of the electrical power are measured at the point of common coupling, and
wherein the carrier signal of at the least one selected converter is adjusted in its phase until the measured harmonics are reduced below a given threshold value.

7. The method according to claim 1, wherein the search algorithm analyzes respective inverted carrier phase adjustments and resulting magnitude changes of the measured harmonics in real time, and the search algorithm controls the respective carrier phase adjustments in real time.

8. The method according to claim 1, wherein the search algorithm includes a stochastic hill-climbing search.

9. The method according to claim 1, wherein the search algorithm includes the following steps:
a) updating a converter state of the at least one converter;
b) calculating a new score function for the updated converter state; and
c) updating a best state if the new score function is greater than a previous score function.

10. The method according to claim 9, wherein the search algorithm further includes iteratively repeating steps a) through c).

11. The method according to claim 1, wherein the search algorithm includes the following steps:
calculating an initial score f(s) for an initial state of harmonics;
calculating a new score f(t) for an updated state of harmonics, wherein the updated state includes the inverted carrier waveforms for the selected one or more converters; and
replacing the initial score f(s) with the new score f(t) when the new score f(t) is greater than or equal to the initial score f(s).

12. The method according to claim 11, wherein the steps are iteratively repeated until at least one of: a threshold number of iterations is reached and a predetermined harmonic level is achieved.

* * * * *